United States Patent [19]
White

[11] 3,846,804
[45] Nov. 5, 1974

[54] FORCE BALANCE INSTRUMENT WITH OVERLOAD RELEASE MECHANISM

[75] Inventor: Jack Mort White, Chili, N.Y.

[73] Assignee: Sybron Corporation, Rochester, N.Y.

[22] Filed: June 24, 1971

[21] Appl. No.: 156,392

[52] U.S. Cl............................. 340/199, 340/187
[51] Int. Cl............................................ G08c 19/08
[58] Field of Search ........... 340/187; 318/645, 656; 73/398 R

[56] References Cited
UNITED STATES PATENTS

| | | | |
|---|---|---|---|
| 3,396,374 | 8/1968 | Barthel | 340/187 |
| 3,459,045 | 8/1969 | Sanford | 73/398 R |
| 3,564,923 | 2/1971 | Nudd | 73/398 R |

*Primary Examiner*—Thomas B. Habecker
*Attorney, Agent, or Firm*—Theodore B. Roessel; Joseph C. MacKenzie

[57] ABSTRACT

A force balance instrument having an overload release mechanism through which the force to be balanced is applied to means for producing the balancing force. The mechanism is a first lever flexure-pivoted to mechanical ground, and having a second lever flexure-pivoted thereto, one end of which is connected to the first lever by a flexible inextensible strip and is forced away from the first lever by a compression spring between the two levers. A hand-shaped flexure element in part provides for both flexure-pivotings.

6 Claims, 5 Drawing Figures

FORCE BALANCE INSTRUMENT WITH OVERLOAD RELEASE MECHANISM

BACKGROUND OF THE INVENTION

The background of the invention, in respect of its field, is force balance measurement of variable condition. That is to say, temperature, pressure or the like is converted to force, and this force is caused to create a counterbalancing force as a function of another condition (e.g., electrical current) more amenable to or convenient for measurements.

As for a description of the prior art, examples are too numerous and well-known to describe them at any length. However, in the present case, U.S. Letters Pat. No. 3,396,374, Barthel, et al, is typical, and indeed may be regarded as a direct ancestor of the present invention.

BRIEF DESCRIPTION OF THE INVENTION

Briefly described, in the present invention, overload release in a force balance instrument is provided for by flexure-pivoting a first lever to mechanical ground, flexure-pivoting a second lever to the first lever. In particular, such flexure-pivoting is provided by a hand-shaped flexure element. A flexible inextensible strip fastens the two levers together and spring means forces the two levers apart as far as the strip will allow. Force, representing the condition to be measured is exerted on the first lever through the second lever and said spring means, so that if said first lever is deflected so far as to contact some stationary part of the instrument, said spring means will give if said force attempts to make the first lever deflect any further, and/or to increase the force with which it contacts said part. In this way, damage to the instrument, such as might be caused if the said first lever deflected too far, or exerted too much force on said part, is prevented.

DETAILED DESCRIPTION OF THE INVENTION

Figure 1:
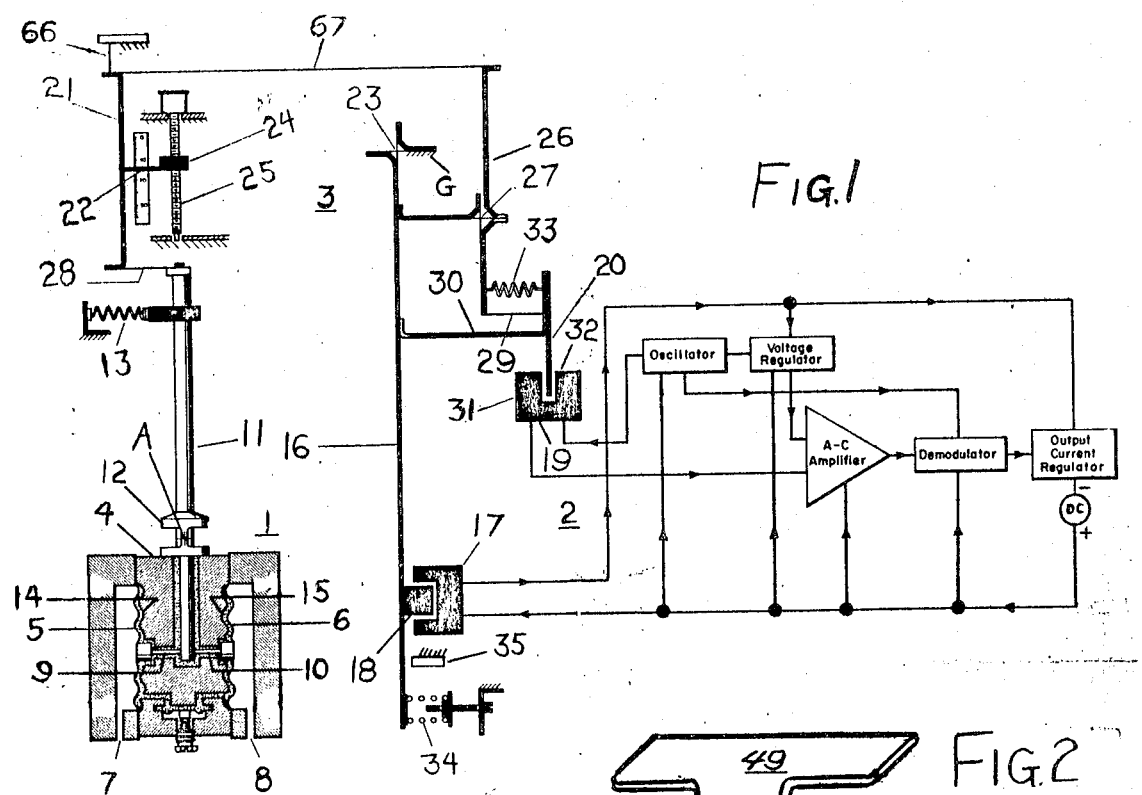
FIG. 1 shows schematically a force balance instrument according to the invention.

In FIG. 1, a force balance instrument according to the invention consists of a condition responsive primary unit 1, feedback unit 2, and linkages, denoted generally by reference numerals 1, 2 and 3.

By way of example, primary unit 1 is a differential pressure motor including a chambered body 4 (shown in section) having therein diaphragms 5 and 6, to which fluid pressures are applied via ports 7 and 8, with the pressure applied to the latter port normally being the higher. Rods 9 and 10 connect the diaphragms to the lower end of a lever 11 passing out of the body 4 through a pivot and seal 12 which constrains lever 11 to angularly deflecting in the plane of the paper about an axis through point A.

Both the diaphragms and the pivot and seal normally elastically resist the deflection of the lever, and in addition a bias spring 13 is provided in order to a suitable amount of net elastic resistance to lever 11 pivoting.

Lever 11 cannot deflect very far, as the diaphragms, which are integrally interconnected together via rods 9 and 10 and the lower end of lever 11, cannot move to the left or right any further than the contoured inner surfaces 14 and 15 of body 4.

Consequently, supposing FIG. 1 shows the described parts in a position obtaining at zero difference between the pressures applied to the diaphragms, then if one of the pressures increases, say that on diaphragm 6, then the lever 11 will deflect clockwise an amount in proportion to the elastic resistance of spring 13, etc. The change in position of lever 11 with respect to its zero difference position represents the magnitude of the pressure difference, and, as well, the amount of energy absorbed by the elastic resistance.

The aforesaid change in position is transmitted, by linkage 3, to the feedback unit 2, which measures the change in position and provides a corresponding deflection of a feedback lever 16 by just enough force that the deflection of lever 16 is fedback through linkage 3 and moves lever 11 substantially back to its zero pressure difference position.

Feedback unit 2 includes a feedback motor consisting essentially of a "voice coil" 17 and a ferromagnetic core 18, wherein the core 18 has a fixed magnetic field which repels the coil 17, in proportion to the ampere turns of the coil. Coil turns are, of course, fixed in any given case, so the current level is established by electrical circuitry shown in box diagram form. This circuitry is labeled, in FIG. 1, and is conventional, so its functioning need not be dwelt on here other than to remark that the windings of a differential transformer device 19 produce an AC signal representative of the position of ferromagnetic core 20 with respect to said windings. As this position is imparted to the core by linkage 3, it represents the position of lever 11, as therefore does also the aforesaid AC signal. The circuitry responds to this AC signal to establish a corresponding DC level in coil 17, the upshot being that the latter represents the magnitude of the force with which diaphragms 5 and 6 attempt to deflect lever 11.

It will be seen that the net change in position of lever 11 is normally practically zero, because every time it tries to change position, the feedback unit 2 adjusts the DC level in coil 18 accordingly. It cannot stay at zero, however, because core 20 must be out of its zero position a slight amount in order that the feedback current level be greater than its zero pressure difference magnitude.

Normally, the range of feedback current level is (4 to 20) ma DC, (10 to 50) ma DC, or something of that sort. The sort of feedback force that can be exerted by current levels of this order, as a practical matter, is measured in ounces, whereas the force that can be exerted by the effect of the pressure on the diaphragms, via lever 11, is one or more orders larger.

Linkage 3 mediates between the force due to pressure and the feedback force. Thus, the upper end of lever 11, upon clockwise deflection of the lever, deflects span lever 21 counter clockwise, in the plane of the drawing, about the fulcrum 22. Lever 21, in turn, deflects the lever feedback lever 16 counterclockwise, in the plane of the drawing, about axis B established by crossed strip pivot 23, which pivots feedback lever 16 to mechanical ground, that it is to say, in effect, to the body 4, or to base or other support structure (not shown) fixed to the body 4, such "ground" being indicated by the cross-hatching identified by G, in the case of pivot 23.

Fulcrum 22 is also fixed to ground, via nut 24 and lead screw 25, which provides for adjusting the range of pressure difference corresponding to maximum deflection of lever 11 from its zero pressure difference position. The coil 17 and device 19 are also fixed to ground.

While proportions in FIG. 1 are somewhat distorted for clarity, they are functionally correct in that, as would be expected, the relatively feeble efforts of the feedback motor (coil 17 and core 18) are given, by the linkage 3, a large mechanical advantage over the more powerful efforts of the differential pressure motor (diaphragms 5 and 6, and body 4), in order to allow the former motor to balance the force due to the latter motor. The upshot of this is that although the most motor 11 can deflect is a few degrees, these few degrees are so magnified at lever 16 and the stationary structure adjacent the lever 16 as so close thereto, that lever 16, and/or parts mounted thereon (e.g., core 20) can be forced against the stationary structure with, often, damaging effect.

According to the invention, excessive deflection of lever 16 is prevented by providing it with overload release mechanism including a lever 26 pivoted to lever 16 by a crossed strip pivot 27. The upper end of lever 26 is connected by a flexible, inextensible strip 67 to the upper end of lever 21 (the lower end of lever 21 is connected by a like strip 28 to the upper end of lever 11, also).

The lower end of lever 26 is connected by a flexible, inextensible strip 29 to an arm 30 fixed to lever 16 and supporting the core 20 between legs 31 and 32 of device 19. The upper end of arm 30 and the lowered end of lever 26 overlap and there between is connected a compression springs 33. The full length of the spring is greater than the length of the strip 29, so the spring is under compression and forces the lower end of lever 26 and the upper end of arm 30 as far apart as strip 29 will allow.

The stiffness of spring 33 is chosen to be such that the maximum force that the feedback motor can apply (supposing lever 26 to be fixed against deflection) will not appreciable compress the spring any further than strip 29 has already done. Conversely, the spring is not so stiff that it can transmit to lever 16 or any part contacted therey, a damaging amount of force.

As will be seen from FIG. 1, any clockwise deflection lever 11 manages to execute is transmitted to lever 16 via the stiffness of spring 33. Under the conditions set out above, as to this stiffness, it will be evident that such deflection will be transmitted to lever 16 as if the spring was incompressible, at least as long as the deflection of lever 16 does not meet any more resistance than the feedback force, and pivot 23 (and a light zero adjusting spring 34 for lever 16) can offer.

However, if such deflection gets enough greater than this, spring 33 will simply compress when lever 16 has deflected as far as it can. Preferably, the amount of compression the spring 33 can undergo should be enough that the lever 11 can deflect to its limit before so much force can be transmitted through spring 33 as to damage some part of the mechanism.

While the intrinsic design of the feedback unit 2, lever 16, etc., can be such that lever deflection is limited thereby, there may be provided the stop 35, fixed to ground, and close enough to the lever 16 that the core 20 cannot be forced against leg 32 of device 19. A typical spacing between legs 31 and 32 is about 1/16 inch, so the core 20 (typically a soft iron plate) would not have to move very far before it runs into leg 32, and the stiffness of spring 33 is enough to transmit a damaging amount of force to core 20. Lever 16 can be made sufficiently sturdy that the reaction force of stop 35, due to compression of spring 33, can be borne by lever 16 without in the least deforming it appreciatively or otherwise damaging it.

The function of strip 29 is to establish an effectively absolutely stable spacing, during normal operation, between the lower end of lever 26 and the arm 30. In other words, if lever 26 is deflected so far as to compress spring 33, strip 29 buckles without appreciable resistance and disconnects lever 16 from the linkage. However, when conditions go back to normal strip 29 is pulled out to precisely (as a practical matter) the taut length it had before the excess deflection occurred.

It will be observed that there is substantially no give at all for excess deflection clockwise of lever 26, since the strip 29 is inextensible when in taut condition. However, such deflection never occurs since counterclockwise deflection of lever 11 cannot transmit any significant amount of force through strips 67 and 28, because they are unable to transmit any significant amount of force except in tension. Lever 21, incidentally is supported at the vertical level shown by what amounts to a flexible inextensible strip 66, which while not appreciably interfering with deflection of lever 21 prevents it from sliding in a vertical direction.

The elements of mechanism referred to in the foregoing description have been somewhat idealized in order to facilitate understanding of operation. However, the exact nature of these elements is rather critical in that the principles of normal operation admit of only very slight net changes in the mechanical configuration of the instrument, and not much larger temporary changes (due to changes in differential pressure, in particular). A great deal of effort therefore, is customarily put into designing the mechanical configuration to avoid play, hysteresis, etc., since these lead to changes in configuration of the same order as due to the differential pressure. Introducing the overload release feature is in some sense contradictory of these desiderata since it perforce provides for both rather larger orders of configuration change than desired normally, and for what amounts to play. According to the invention, a specific construction of levers 16 and 26 and their connection to each other, and to ground, is provided which, in effect, prevents the overload release feature from introducing play, hysteresis, etc., to any significant extent, into the linkage 3.

Figure 4:
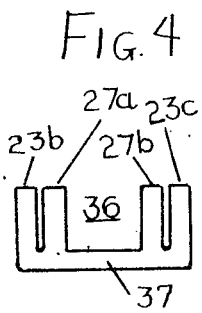
FIGS. 4 and 5 are plan views of flexure elements according to the invention.
Figure 2:
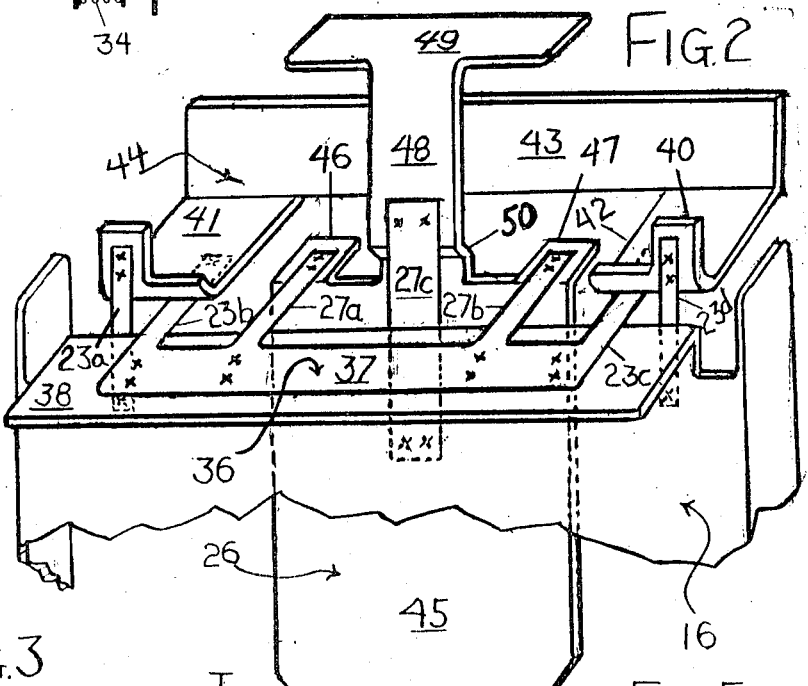
FIG. 2 is a perspective view of a specific construction of overload release mechanism and of said first and second levers and flexure pivots therefor according to the invention.
Figure 3:
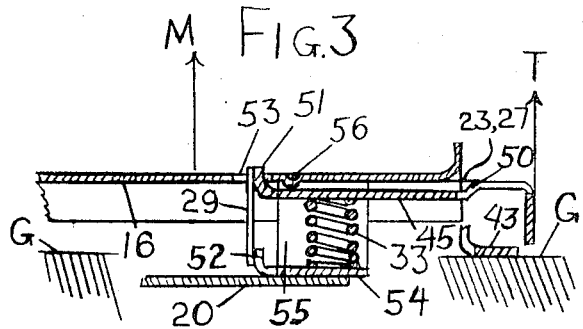
FIG. 3, is a sectional view of a portion of the structure shown in FIG. 2.

The aforesaid specific construction is illustrated in FIGS. 2, 3 and 4. It is to be observed that FIG. 3 is substantially to full scale (thickness of material is slightly exaggerated, however), as is FIG. 4, whereas the perspective view of FIG. 2, somewhat larger than life, has been suitably distorted as to relative dimensions of parts for clarity in illustration and explanation.

In FIG. 2, lever 16 is seen to be a channel-like member, most of which is broken away since the only portion thereof of interest is in the vicinity of the pivot 23. Pivot 23 is actually four metal strips 23a, 23b, 23c and 23d, of the usual sort, except that strips 23b and c are two fingers of a handshaped unitary flexure element 36. Welds, indicated by small x's, fix the palm 37 of flexure element 36 to a flange 38 of lever 16, fix the lower ends (shown in dashed line) of strips 23a and 23d to the side of lever 16 away from view in FIG. 2, and fix the upper ends of strips 23a and 23d to lugs 39 and 40 projecting from legs 41 and 42 projecting from the base 43 of a bracket 44, said base providing for fixing the bracket to ground, thereby pivoting the lever 16 for deflection as explained in connection with FIG. 1.

Flexure 27 is provided by strips 27a and 27b, which are the other two fingers of the flexure element 36, and strip 27c, which is a separate element, several times the width of the other strips. As in the case of the lower ends of strips 23a and 23b, welds fix the lower end (shown in dashed line) of strip 27c to the side of lever 16 away from view in FIG. 2. The upper ends of strips 27a, b and c are welded to lever 26. Lever 26 is in the form of a flat plate 45, having lugs 46 and 47, and arm 48 projecting therefrom. Arm 48 has a plate 49 projecting therefrom to provide for connection to upper tension strip 27, and is offset, as indicated at 50, to properly locate the near surface of arm 48 for welding the strip 27c thereto while allowing the near surface of plate 45 to be slightly spaced and parallel to the side of lever 16 away from view in FIG. 2. The upper surfaces of lugs 46 and 47 have the upper ends of strips 27a and 27b welded thereto, and are coplanar with the undersurfaces of legs 41 and 42, to which undersurfaces the far ends of strips 23b and 23c are welded.

The foregoing description completes the crossed-strip pivoting of lever 26 to lever 16, and lever 16 to ground. It will be seen that in this construction pivots 23 and 27 are coaxial. Due to the relatively large width of the lever 16 and 26, there are, functionally, four crossed-strip pairs, two for each lever. Actually, there are but four distinct flexure elements; strips 23a and b, wide strip 27c, and the hand-shaped flexure element 36, which greatly aids assembly of the lever 16 and 26 and bracket 44 together.

Figure 5:
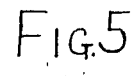

In practice, for maximum ease of assembly, the number of distinct flexure elements can be, and preferably are, reduced to two, as indicated in FIG. 5, (which is on the same scale as FIG. 4). Thus, strips 23a, 27c and 23d are the fingers of a hand-shaped flexure element 58 having a palm 59, and being substitutable for the separate strips 23a, 27c and 23d of FIG. 2.

FIG. 3 shows that strip 29 is fastened between lugs 51 and 52, lug 51 projecting from plate 45 of lever 26 through a suitable hole 53 in lever 16. Lug 52 projections from a u-shaped bracket 54 (which provides arm 30 of FIG. 1) the legs of which (only one, 55, is shown) straddle lever 26 and are fixed to lever 16. Spring 33, fixed between plate 45 and the bracket 54 by means not shown, forces the lever 26 clockwise toward a protrusion 56 formed in lever 16, in order to provide parallelism between the levers when assembling (by welding) strip 29 to the lugs 51 and 52. In assembled condition, plate 45 should not quite contact protrusion 56 since the position of lever 26 with respect to lever 16 is rather to be set by strip 29, except, of course, when overload pulls the plate 45 away from lever 26. It is to be remarked that the combination of strip 29 and spring 33 is known per se as an overload releasing interconnection between a pair of levers.

The pivots 23 and 27 are shown in FIG. 3 figuratively as a simple cross location the effective axis of deflection of levers 16 and 26. Arrows M and T show the directions of the magnetic feedback force and tension of strip 67, respectively. As will be seen from FIG. 3, if the tension T is so great as to deflect levers 16 and 26 together about the 23, 27 axis far enough to make lever 16 strike the ground G at lower left of FIG. 3, then further increase in tension T will simply compress spring 33, and only lever 16 will deflect further.

Various applications of the invention will be obvious to one skilled in the art. For example, feedback units equivalent to the electrical unit 2, but energized by fluid pressure, or other form of energy, are well known. Again, equivalents of the primary unit 1 are known for delivering force representative of conditions other than pressure are also well-known. Finally, the linkage 3 as a whole also has its equivalents. All such equivalents are within the scope of the claims appended hereto.

Having set forth my invention as prescribed by the statutes, I claim:

1. A force balance instrument including:
   a first motor, a second motor and a linkage, said linkage having a first lever and a second lever connecting said linkage to said first motor and to said second motor, respectively;
   said first motor being responsive to a first condition for first deflection of said first lever with respect to ground in proportion to the magnitude of said first condition;
   said second motor being responsive to a second condition for second deflection of said second lever with respect to ground in proportion to the magnitude of said second condition;
   said linkage being responsive to said first deflection and to said second deflection to respectively convert them into a first force and a second force acting on said second lever so as to urge said second lever to deflect in opposing senses about a first given axis;
   there being control means for causing the magnitude of said second condition to be of such value that said forces create equal and opposite moments about said first given axis, whereby the magnitude of said second condition is a measure of the magnitude of said first condition;
   said second lever having as part therof;
   a third lever, said second and third levers being flexure-pivoted together for relative deflection about a second given axis;
   flexible, inextensible means integrally fixed to both said second and third levers for limiting said relative deflection when of one sense, while providing for said relative deflection when of a sense opposite said one sense;
   spring means interconnecting said levers for urging said relative deflection to be in said one sense and for resisting relative deflection in the other said sense;
   and one of said second and third levers being flexure-pivoted to ground for defining said first given axis.

2. The instrument of claim 1, wherein said first and second given axes are substantially coincident.

3. The instrument of claim 1, wherein said flexible, inextensible means is a metal strip.

4. The instrument of claim 1, wherein said second and third levers are pivoted together by a first crossed strip pivot means, and said one of said second and third levers is pivoted to ground by a second crossed strip pivot means.

5. The instrument of claim 1, wherein said pivots have an element in common, said element being in the form of a hand having fingers in the form of parallel strips projecting from the palm thereof, said strips and palm being substantially coplanar, said palm being fixed to said one of said second and third levers, certain of said fingers being fixed to ground and certain of said fingers being fixed to the other of said second and third levers.

6. The instrument of claim 5, wherein said pivots have a second element in common, said second element being in the form of a hand having fingers in the form of parallel strips projecting from the palm thereof, the last said strips and the last said palm being sbustantially coplanar, said last said plam being fixed to said other of said second and third levers, certain of said last said fingers being fixed to ground and certain of said last said fingers being fixed to said one of said second and third levers.

* * * * *